United States Patent Office 3,144,482
Patented Aug. 11, 1964

---

3,144,482
α-CHLORINATION OF DIVALENT SULFUR COMPOUNDS
Roy B. Flay, Concord, Calif., assignor to California Research Corporation, San Francisco, Calif., a corporation of Delaware
No Drawing. Filed Sept. 12, 1960, Ser. No. 55,108
6 Claims. (Cl. 260—543)

The present invention relates to a process for α-chlorination of divalent sulfur compounds, i.e., substituting a chlorine atom on a carbon atom adjacent to a divalent sulfur. More particularly, the invention provides a process for α-chlorinating certain divalent sulfur compounds in the presence of a catalytic amount of chlorosulfonic acid.

In the past it has been extremely difficult, of not impossible, to make certain potentially valuable agricultural fungicides by reason of the difficulty encountered in chlorinating certain organic divalent sulfur compounds at a carbon atom adjacent to a sulfur atom, i.e., an α-carbon atom. For example, the compounds 1,2,2,2-tetrachloroethylsulfenyl chloride may be easily prepared by reacting a bis-1,2,2,2-tetrachloroethyl disulfide with a chlorine in a known manner. However, attempts to substitute a second chlorine atom on the α-carbon atom of the ethyl group of this sulfenyl chloride have been unsuccessful. When carried out according to methods known in the art, employing well-known chlorination catalysts such as anhydrous aluminum or ferric chloride with or without the presence of ultraviolet light, peroxides, or iodine, at temperatures up to about 50° C., no α-chlorination occurred. Perhaps at higher temperatures some α-chlorination could be induced, but not without the concomitant and undesirable consequences of rearrangement and/or decomposition of the desired product.

It has now been discovered that these previously impossible or impractical α-chlorination reactions may be successfully carried out at low temperatures to obtain almost quantitative α-chlorination by contacting the described compounds with chlorine in the presence of a chlorosulfonic acid catalyst.

The process of the invention comprises contacting the desired divalent sulfur, compound with chlorine at a temperature between about −20° C. and +50° C., preferably about −10° to +10° C., in the presence of an amount of chlorosulfonic acid equal to about 0.10 to 5.0 percent, preferably 0.25 to 1.0 percent, based on the weight of the sulfur compound used.

Suitable α-chlorinatable starting materials within the scope of the invention have the formula

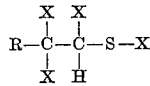

wherein R is an organic radical, preferably alkyl, aryl, aralkyl, alkaryl, or substituted members thereof, or is hydrogen or halogen, and X is halogen. Precursors of these compounds, such as disulfides or thiols, which form the sulfenyl chloride on chlorination under the conditions employed, are also suitable. It is noted, however, that any organic radical above disclosed must be one which is unreactive with the catalyst at the reaction conditions herein employed. Preferred starting materials include bis-1,2,2,2-tetrachloroethyl disulfide, 1,2,2,2-tetrachloroethylsulfenyl chloride, bis-1,2,2-trichloroethyl disulfide, and 1,2,2-trichloroethylsulfenyl chloride.

The process of the invention is carried out by contacting the desired divalent sulfur compound admixed with a suitable inert solvent, e.g., carbon tetrachloride, if desired, with approximately stoichiometric amounts of chlorine gas in the presence of the required quantities of catalyst, i.e., 0.10 to 5.0 percent based on the weight of the sulfur compound. An excess over or less than stoichiometric amounts of chlorine may be used without unduly harming the reaction. The temperature is controlled at the desired level by cooling in an ice bath while the gaseous chlorine is slowly bubbled in so as to control the rate of formation of gaseous hydrogen chloride evolved. After completion of chlorine addition, the reaction is quenched with ice water and the acid removed by water extraction. The solvent is then stripped at about 40° C. and 20 mm. pressure. Where the product is a liquid at normal temperature and pressure, it is removed from the mixture by fractionation, preferably at reduced pressure. Where it is a solid, the mixture is chilled to allow the solid to crystallize, whereupon, if desired, it is washed with a suitable solvent, such as methanol.

Prior to this invention, there was believed to be no practical way to obtain certain useful chemical intermediates such as 1,1,2,2-tetrachloroethylsulfenyl chloride and perchloroethylsulfenyl chloride. Also, many other useful intermediates and compositions may be prepared easily and in nearly quantitative yields by employing the unique catalytic chlorination process of the invention.

The process of the invention is more clearly illustrated by reference to the following examples. It is to be observed that these examples are included merely by way of illustration, and are not to be construed as further limitations on the scope of the invention.

*Example 1*

Five separate mixtures of 200 g. 1,2,2-trichloroethylsulfenyl chloride and 200 ml. carbon tetrachloride, each having 2 g. of one of the following catalysts, were prepared:

(1) Anhydrous aluminum trichloride
(2) Anhydrous ferric chloride
(3) Benzoyl peroxide
(4) Anhydrous ferric chloride in the presence of ultraviolet light
(5) Iodine.

To each mixture, 71 g. of chlorine were slowly added over a period of about one-half hour while the mixture was continuously agitated and maintained at about 0°–5° C. by means of an ice bath. In all of the above cases, essentially no α-chlorination occurred, as shown by far infrared spectra.

*Example 2*

A mixture of 200 g. 1,2,2-trichloroethylsulfenyl chloride, 200 ml. carbon tetrachloride, and 4 g. chlorosulfonic acid was prepared as in Example 1, except for the addition of the catalyst. 71 g. of chlorine were slowly added over a period of about one-half hour while the mixture was continuously agitated and maintained at about 0°–5° C. by means of an ice bath. 1,1,2,2-tetrachloroethylsulfenyl chloride was obtained. The analysis of 1,1,2,2-tetrachloroethylsulfenyl chloride is as follows:

|  | Theory | Found |
|---|---|---|
| Percent chlorine | 75.6 | 72 |
| Percent sulfur | 13.6 | 13.8 |

The foregoing examples should not be considered as limitations on the scope of the invention. As will be evident to those skilled in the art, various modifications in the process can be made or followed, in the light of the foregoing disclosure, without departing from the spirit or scope of the invention or from the scope of the following claims:

I claim:

1. A method of α-chlorinating a divalent sulfur compound of the formula

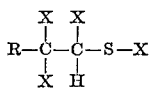

wherein R is selected from the class consisting of hydrogen and halogen, and X is halogen, which comprises contacting said sulfur compound with chlorine at a temperature of about −20° C. to +50° C. in the presence of chlorosulfonic acid in an amount of from about 0.10 to 5.0 percent by weight of said sulfur compound.

2. A method of claim 1 wherein the temperature is between −10° and +10° C.

3. A process according to claim 1 wherein R is H.

4. A method of α-chlorinating 1,2,2-trichloroethylsulfenyl chloride which comprises contacting 1,2,2-trichloroethylsulfenyl chloride with chlorine at a temperature of about −20° C. to +50° C. in the presence of chlorosulfonic acid in an amount from about 0.10 to 5.0 percent by weight of said sulfenyl chloride.

5. A method according to claim 4, wherein the temperature is between −10 and +10° C.

6. A method of α-chlorinating a divalent sulfur compound of the formula

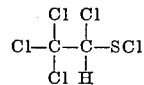

which comprises contacting said sulfur compound with chlorine at a temperature of about −20° C. to +50° C. in the presence of chlorosulfonic acid in an amount of from about 0.10 to 5.0 percent by weight of said sulfur compound.

No references cited.